(12) United States Patent
Marwali et al.

(10) Patent No.: US 12,542,447 B2
(45) Date of Patent: Feb. 3, 2026

(54) SIMULTANEOUS CHARGING AND POWER EXPORT USING N-LEG CONVERTER

(71) Applicant: Rivian IP Holdings, LLC, Plymouth, MI (US)

(72) Inventors: Mohammad Nanda R. Marwali, Irvine, CA (US); Zahra Mohajerani, Los Angeles, CA (US); Muhammad Mobeen Mahmood, Irving, TX (US); Yuxiang Shi, Cary, NC (US); Yanjun Shi, Torrance, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 371 days.

(21) Appl. No.: 18/091,911

(22) Filed: Dec. 30, 2022

(65) Prior Publication Data

US 2024/0222990 A1 Jul. 4, 2024

(51) Int. Cl.
*H02J 7/00* (2006.01)
*B60L 53/22* (2019.01)
(Continued)

(52) U.S. Cl.
CPC ............ *H02J 7/0068* (2013.01); *B60L 53/22* (2019.02); *H02J 7/02* (2013.01); *H02M 1/0058* (2021.05);
(Continued)

(58) Field of Classification Search
CPC .... H02M 7/797; H02M 7/219; H02M 1/0058; B60L 53/00; B60L 53/20; B60L 53/22;
(Continued)

(56) References Cited

U.S. PATENT DOCUMENTS 5,656,915 A 8/1997 Eaves
9,035,608 B2 * 5/2015 Loudot ................... B60L 53/20
320/109
(Continued)

FOREIGN PATENT DOCUMENTS

CN 108258906 A * 7/2018 .......... H02M 3/1582
CN 112389227 A 2/2021
(Continued)

OTHER PUBLICATIONS

Improving light load power factor for GaN based Totem Pole bridgeless PFC using digital phase locked loop based vector cancellation & tracking error compensation. M Bhardwaj, SY Yu, Z Ye, S Choudhury 2018 IEEE Applied Power Electronics Conference and Exposition (APEC), 2018 (Year: 2018).*
(Continued)

*Primary Examiner* — Thienvu V Tran
*Assistant Examiner* — Yahveh Comas Torres
(74) *Attorney, Agent, or Firm* — HG LAW LLP

(57) ABSTRACT

Systems and methods for simultaneously generating a charging signal and a power signal via a converter having a first leg, a second leg, a third leg, and a fourth leg are disclosed herein. An alternating current (AC) source input voltage having a fundamental frequency of a power system is received. The charging signal is generated by the first leg and the second leg and the power signal is generated by the second leg, the third leg, and the fourth leg. The second leg is switched at the fundamental frequency and the first leg, the third leg, and the fourth leg are switched at frequencies higher than the fundamental frequency.

20 Claims, 7 Drawing Sheets

(51) Int. Cl.
    *H02J 7/02*           (2016.01)
    *H02M 1/00*         (2007.01)
    *H02M 7/219*        (2006.01)

(52) U.S. Cl.
    CPC ......... *H02M 7/219* (2013.01); *B60L 2210/30* (2013.01); *H02J 2207/20* (2020.01)

(58) Field of Classification Search
    CPC .... B60L 58/10; B60L 2210/30; H02J 7/0068; H02J 7/02; Y02B 90/14; Y02B 70/10
    See application file for complete search history.

(56) References Cited

U.S. PATENT DOCUMENTS

| | | | |
|---|---|---|---|
| 10,013,007 B2 * | 7/2018 | Liu | H02M 3/1584 |
| 11,177,682 B2 * | 11/2021 | Chang | H02M 1/10 |
| 11,251,625 B2 * | 2/2022 | Sun | H02M 1/10 |
| 11,413,983 B2 * | 8/2022 | Ge | H02M 1/14 |
| 11,757,371 B1 * | 9/2023 | Marwali | H02M 7/527 |
| | | | 363/41 |
| 11,855,543 B2 * | 12/2023 | Teng | H02M 3/33584 |
| 11,865,933 B2 * | 1/2024 | Teng | H02P 27/06 |
| 11,916,474 B2 * | 2/2024 | Everts | H02M 7/487 |
| 2014/0097792 A1 * | 4/2014 | Su | B60L 53/12 |
| | | | 320/108 |
| 2019/0299792 A1 * | 10/2019 | Kim | H02M 1/4233 |
| 2020/0083727 A1 * | 3/2020 | Sun | H02M 7/797 |
| 2021/0221249 A1 * | 7/2021 | Ge | H02M 1/4225 |
| 2022/0360184 A1 * | 11/2022 | Teng | H02J 7/02 |
| 2023/0231470 A1 * | 7/2023 | Ammanamanchi | H02M 3/33584 |
| | | | 320/128 |
| 2023/0353045 A1 * | 11/2023 | Mino | H02M 1/4225 |
| 2024/0429831 A1 * | 12/2024 | Sreedhar | H02M 3/01 |

FOREIGN PATENT DOCUMENTS

| | | |
|---|---|---|
| DE | 102009000096 A1 | 7/2010 |
| DE | 102011075927 A1 | 11/2012 |
| JP | 2014161142 A * | 9/2014 |
| WO | WO-2007148531 A1 * 12/2007 | ............... B60K 6/26 |
| WO | WO-2021205040 A1 * 10/2021 | ............... H02J 7/04 |

OTHER PUBLICATIONS

Machine translation JP-2014161142-A (Year: 2014).*
Machine translation WO-2007148531-A1 (Year: 2007).*
Machine Translation CN_108258906_A (Year: 2018).*

* cited by examiner

SIMULTANEOUS CHARGING AND POWER EXPORT USING N-LEG CONVERTER

INTRODUCTION

The present disclosure relates to n-leg converters and, more particularly, to systems and related processes for controlling an n-leg converter using totem-pole pulse width modulation (PWM) to provide simultaneous charging and power export.

SUMMARY

N-leg converters (e.g., converters using a plurality of legs, each comprising a plurality of switches) are utilized to provide charging (e.g., rectifying) or power export (e.g., inverting) for a multitude of applications. One such application is an electric vehicle on-board-charger (OBC), in which the converter provides charging to a battery of the electric vehicle or exports power from the battery of the electric vehicle to an output port of the electric vehicle or to power systems of the electric vehicle. For example, to provide charging to a battery, the converter may receive an alternating current (AC) voltage (e.g., from an AC power grid), convert the AC voltage to a direct current (DC) voltage (e.g., AC-DC conversion), and provide the DC voltage to the battery. To provide power export, the converter may convert the DC voltage of the battery to an AC voltage (e.g., DC-AC conversion) and provide the AC voltage to an output port of the electric vehicle or to power systems of the electric vehicle.

In one approach, a Sine PWM method is used to switch the switches of an N-leg converter. However, in this approach, all the switches of the converter must be switched at a high frequency (e.g., greater than a fundamental grid frequency) and a high DC bus voltage will be required (e.g., due to low DC bus voltage utilization). In another approach, to prevent conflicting requirements between charging and power export functions, the converter is operated to provide only one of charging or power export at a time. However, in this approach, a battery of an electric vehicle cannot be charged while providing power export to an output port of the electric vehicle or to power systems of the electric vehicle.

For improved efficiency and usability, the present disclosure provides systems and methods for controlling an n-leg converter (e.g., having at least four legs) to provide simultaneous charging and power export, while reducing switching losses. For example, the present disclosure uses totem-pole PWM (e.g., a PWM method in which one leg of the n-leg converter is switched at the low fundamental grid frequency of the AC voltage) to control the converter when performing charging and power export. By operating the converter under these conditions, power conversion efficiency of the converter may be improved, while providing for simultaneous charging and power export.

A method for simultaneously generating a charging signal and a power signal via a converter having a first leg, a second leg, a third leg, and a fourth leg, is provided. The method includes receiving an alternating current (AC) source input voltage having a fundamental frequency of a power system, generating, by the first leg and the second leg, the charging signal and generating, by the second leg, the third leg, and the fourth leg, the power signal. The second leg is switched at the fundamental frequency and the first leg, the third leg, and the fourth leg are switched at frequencies higher than the fundamental frequency.

In some embodiments, the charging signal and the power signal may be synchronized to the received AC source input voltage using a phase-lock-loop such that a polarity of the charging voltage is equal to a polarity of the power signal.

In some embodiments, the method may further include inserting a blanking period at zero crosses of the charging voltage and the power signal, where during each blanking period, switches of the first leg, the second leg, the third leg, and the fourth leg are switched off.

In some embodiments, the power signal may be a split-phase power signal having a root mean square voltage of 240V.

In some embodiments, the fundamental frequency may be within a range of 50-60 Hz.

In some embodiments, the switching frequencies of the first leg, the third leg, and the fourth leg may be within a range of 1 kHz-10 MHz.

A method for simultaneously generating a split-phase power signal and a charging signal via a converter having a first leg, a second leg, a third leg, and a fourth leg, is provided. The method includes receiving an alternating current (AC) source input voltage having a fundamental frequency of a power system, switching, at a first frequency, the first leg comprising a first switch and a second switch to generate a first signal, switching, at the fundamental frequency, the second leg comprising a third switch and a fourth switch to generate a second signal, switching, at a third frequency, the third leg comprising a fifth switch and a sixth switch to generate a third signal, and switching, at a fourth frequency, the fourth leg comprising a seventh switch and an eight switch to generate a fourth signal. The method further includes generating, based on the first signal and the second signal, the charging voltage for charging a battery connected to the converter, and generating, based on the second signal, the third signal, and the fourth signal, the split-phase power signal.

In some embodiments, the split-phase power signal and the charging voltage may be synchronized to the received AC source input voltage using a phase-lock-loop such that a polarity of the charging voltage is equal to a polarity of the split-phase power signal.

In some embodiments, the method may further include inserting a blanking period at zero crosses of the charging voltage and the split-phase power signal, where during each blanking period, each of the first switch, the second switch, the third switch, the fourth switch, the fifth switch, the sixth switch, the seventh switch, and the eight switch may be switched off.

In some embodiments, each of the third switch and the fourth switch may include a metal-oxide-semiconductor field effect transistor (MOSFET), insulated-gate bipolar transistor, or any combination thereof. In some embodiments, each of the first switch, the second switch, the fifth switch, the sixth switch, the seventh switch, and the eighth switch may include a wide-band-gap semiconductor device.

A method for simultaneously generating a single-phase power signal and a charging signal via a converter having a first leg, a second leg, a third leg, and a fourth leg, is provided. The method includes receiving an alternating current (AC) source input voltage having a fundamental frequency of a power system, switching, at a first frequency, the first leg comprising a first switch and a second switch to generate a first signal, switching, at a second frequency, the second leg comprising a third switch and a fourth switch to generate a second signal, switching, at a third frequency, the third leg comprising a fifth switch and a sixth switch to generate a third signal, and switching, at the fundamental frequency, the fourth leg comprising a seventh switch and an eighth switch to generate a fourth signal. The method further includes generating, based on the first signal, the second signal, and the fourth signal, the charging voltage for charging a battery connected to the converter, and generating, based on the third signal and the fourth signal, the signal-phase power signal.

In some embodiments, the single-phase power signal and the charging voltage may be synchronized to the received AC source input voltage using a phase-lock-loop such that a polarity of the charging voltage is equal to a polarity of the single-phase power signal.

In some embodiments, the method may further include inserting a blanking period at zero crosses of the charging voltage and the single-phase power signal, where during each blanking period, each of the first switch, the second switch, the third switch, the fourth switch, the fifth switch, the sixth switch, the seventh switch, and the eight switch may be switched off.

In some embodiments, each of the seventh switch and the eighth switch may include a metal-oxide-semiconductor field effect transistor (MOSFET), insulated-gate bipolar transistor, or any combination thereof. In some embodiments, each of the first switch, the second switch, the third switch, the fourth switch, the fifth switch, and the sixth switch may include a wide-band-gap semiconductor device.

A method for operating a converter having a plurality of legs, is provided. The method includes receiving an alternating current (AC) source input voltage having a fundamental frequency, generating, using two of the plurality of legs, a first power signal, and generating, using three of the plurality of legs, a second power signal. A shared leg is used to generate the first and second power signals simultaneously, and the shared leg is switched at the fundamental frequency that is lower than switching frequencies of the other legs of the plurality of legs.

A method for operating a converter having a plurality of legs, is provided. The method includes using a shared leg to simultaneously generate a first power signal and a second power signal, and inserting a blanking period in the plurality of legs when the first power signal conflicts with the second power signal.

In some embodiments, the first power signal conflicts with the second power signal when control signals for generating the first power signal and the second power signal conflict (e.g., direct the converter to simultaneously generate power signals having different polarities.

An OBC including a converter having a plurality of legs and control circuitry configured to control the converter is provided. The OBC includes an input port for receiving an alternating current (AC) source input voltage having a fundamental frequency and control circuitry configured to perform any of the methods discussed above and below.

In some embodiments, an electric vehicle including the OBC and a battery is provided.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
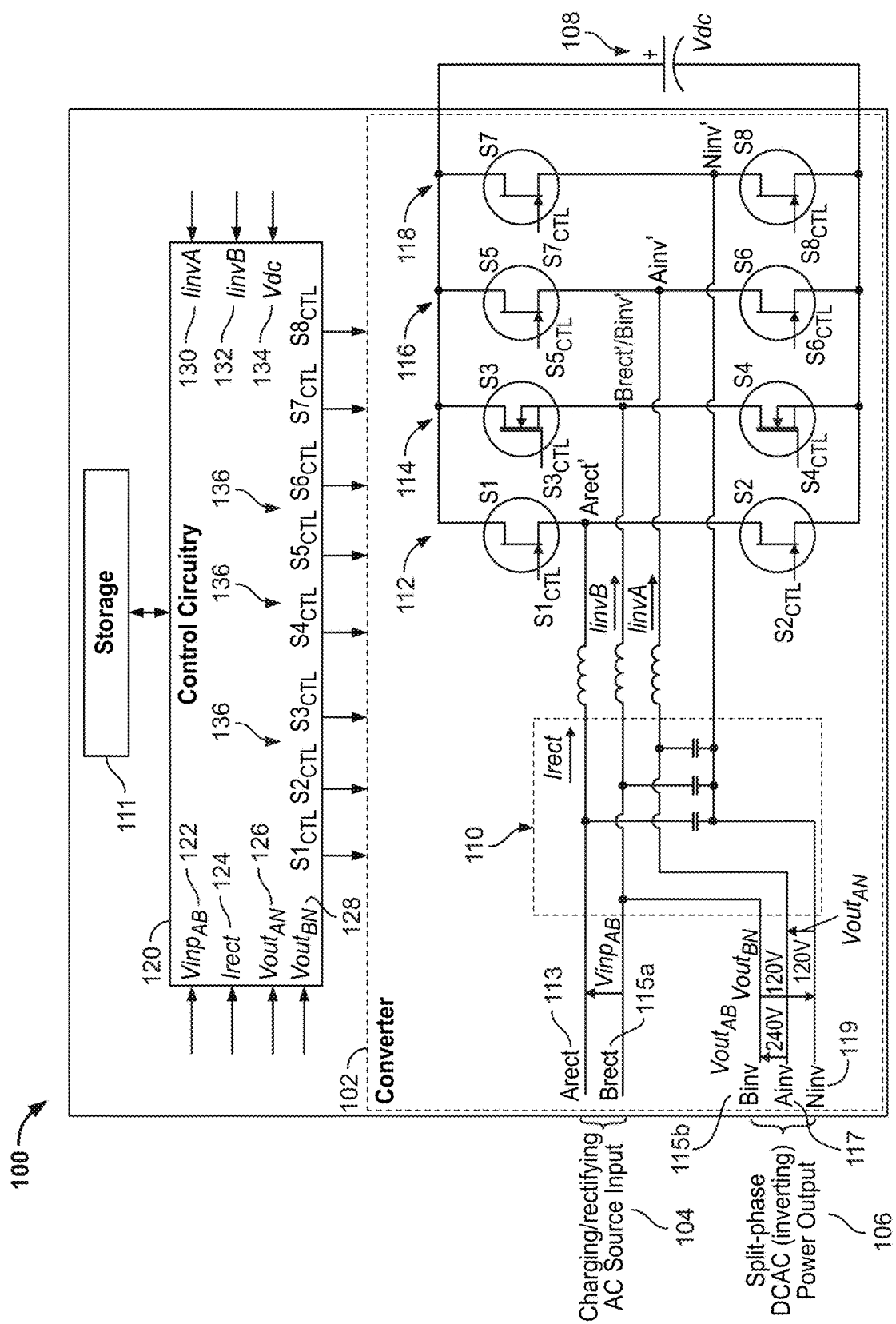
FIG. 1 is an illustrative block diagram of an OBC for an electric vehicle, in accordance with some embodiments of the present disclosure.

FIG. 1 is an illustrative block diagram of an OBC 100 for an electric vehicle, in accordance with some embodiments of the present disclosure. Although an OBC for an electric vehicle is described, it should be understood that the OBC 100 may be used for suitable power conversion application that provides charging (e.g., a rectifying function) and power export (e.g., an inverting function). As shown, the OBC 100 includes a converter 102 (e.g., a power converter), a storage 111, and control circuitry 120 configured to control the converter 102 to simultaneously charge a battery 108 (e.g., a battery of an electric vehicle) and to provide power export (e.g., a 240V and/or a 120V power signal) from the battery 108. For example, the converter 102 may generate a first power signal (e.g., a power signal) and a second power signal (e.g., a charging signal).

The storage 111 may be an electronic storage device. As referred to herein, the phrase "electronic storage device" or "storage device" should be understood to mean any device for storing electronic data, computer software, or firmware, such as random-access memory, read only memory, solid state devices, or any other suitable fixed or removable storage devices, and/or any combination of the same. The storage 111 may be used to store various types of instructions, rules, and/or other types of data. In some embodiments, the control circuitry 120 executes instructions for an application stored in the storage 111 (e.g., to implement one or more of a plurality of modules). Specifically, the control circuitry 120 may be instructed by the application to perform the functions discussed herein. In some implementations, any action performed by the control circuitry 120 may be based on instructions received from the application. For example, the application may be implemented as software or a set of executable instructions that may be stored in the storage 111 and executed by the control circuitry 120 to implement steps of various methods described herein.

Figure 5:
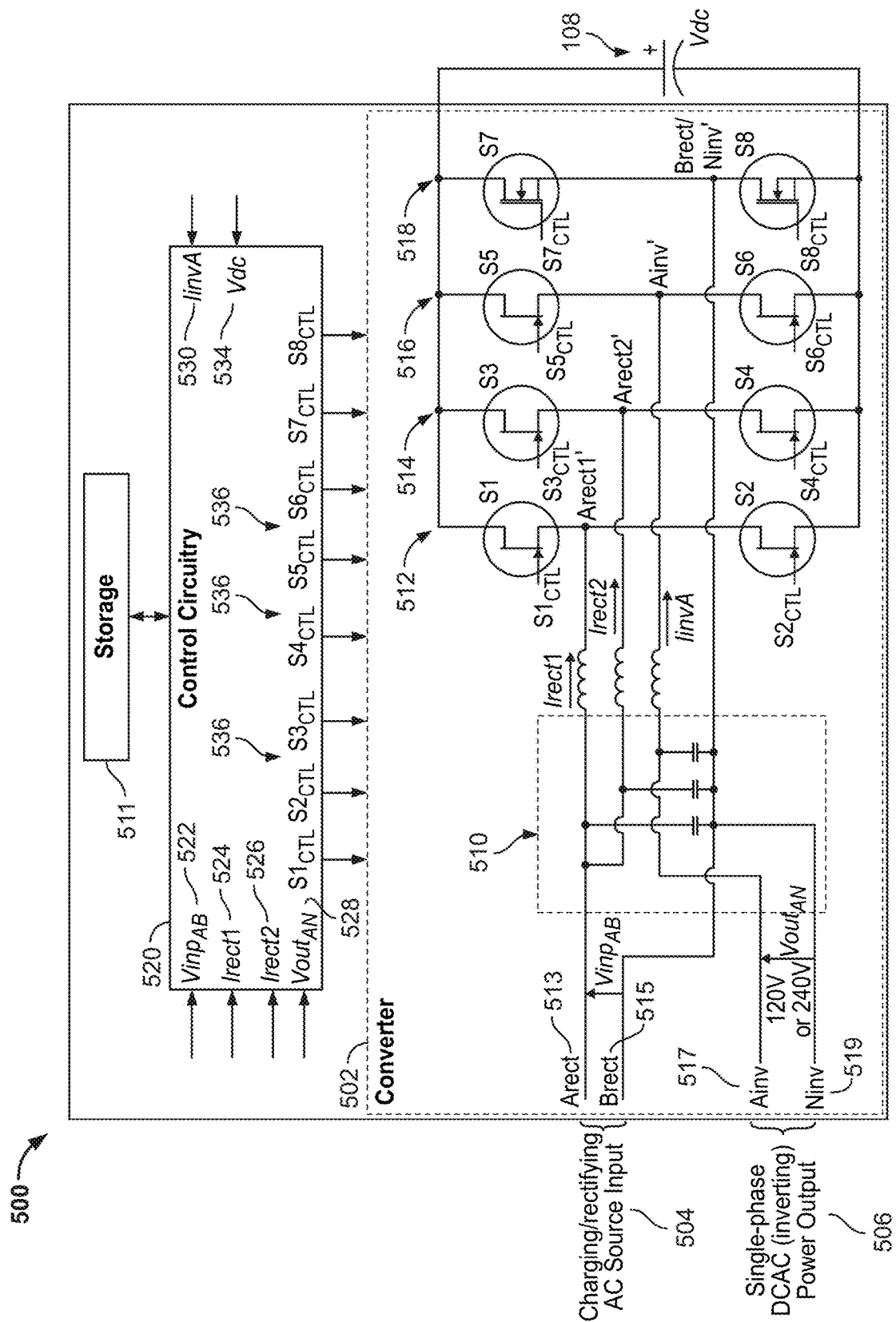
FIG. 5 shows an illustrative block diagram of an OBC for an electric vehicle, in accordance with some embodiments of the present disclosure.

As shown, converter 102 is a four-leg converter including a first leg 112, a second leg 114, a third leg 116, and a fourth leg 118. Although a four-leg converter is shown, it should be understood that the converter 102 may include additional legs (e.g., for increasing the power output of the converter 102). As shown, the first leg 112 includes switches S1 and S2, the second leg 114 includes switches S3 and S4, the third leg 116 includes switches S5 and S6, and the fourth leg 118 includes switches S7 and S8. The first leg 112 is configured to generate a first signal (Arect') in response to switch control signals $S1_{CTL}$ and $S2_{CTL}$ switching the first and second switches S1 and S2, respectively. The second leg 114 is a shared leg between the power output and charging functions and is configured to generate a second signal (Brect'/Binv') in response to switch control signals $S3_{CTL}$ and $S4_{CTL}$ switching the third and fourth switches S3 and S4, respectively. The third leg 116 is configured to generate a third signal (Ainv') in response to switch control signals $S5_{CTL}$ and $S6_{CTL}$ switching the fifth and sixth switches S5 and S6, respectively. The fourth leg 118 is configured to generate a fourth signal (Ninv') in response to switch control signals $S7_{CTL}$ and $S8_{CTL}$ switching the seventh and eight second switches S7 and S8, respectively. Although the converter 102 is described with respect to switches (and in some examples, transistors), it should be appreciated that switches S1-S8 may be other kinds of switching devices. One or more of the switch control signals $S1_{CTL}$-$S8_{CTL}$ may be pulse-width modulated signals. The pulse widths of these signals are modulated to control respective switches, and together, the switches simultaneously generate a desired charging signal for charging the battery 108 and a desired output power signal (e.g., a split-phase AC signal having a root mean square (RMS) voltage of 240V across outputs 115b and 117, AC signals having an RMS voltage of 120V across outputs 115b and 119 and/or outputs 117 and 119). In some embodiments, if only a single-phase AC signal is desired, the converter 102 may be configured as illustrated in FIG. 5. The control circuitry 120 may generate the switch control signals $S1_{CTL}$-$S8_{CTL}$ as explained in further detail below.

As shown, the control circuitry 120 includes a plurality of voltage and current input ports, including first voltage input port 122 ($Vinp_{AB}$), second voltage input port 126 ($Vout_{AN}$), third voltage input port 128 ($Vout_{BN}$), fourth voltage input port 134 (Vdc), first current input port 124 (Irect), second current input port 130 ($Iinv_A$), and third current input port $Iinv_B$). The control circuitry 120 is configured to sense a voltage an AC source input voltage ($Vinp_{AB}$) across inputs 113 and 115a via the first voltage input port 122. The AC source input voltage may be a voltage received from a power system (e.g., 120V or 240V) at input port 104 and may have a fundamental frequency of the power system (e.g., 50 Hz or 60 Hz (e.g., in the U.S.)). The control circuitry 120 is configured to sense a first AC output voltage ($Vout_{AN}$) across outputs 117 and 119 via the second voltage input port 126 and a second AC output voltage ($Vout_{BN}$) across outputs 115b and 117 via the third voltage input port 128. The control circuitry 120 is configured to sense a DC link voltage ($V_{dc}$) across the output of the converter 102 via the fourth voltage input port 134. The control circuitry 120 is configured to sense a first current (Irect) of the AC source input voltage at input 113. The control circuitry 120 is configured to sense a second current (IinvA) via the second current input port 130 and sense a third current (InivB) via the third current input port 132. The control circuit 120 also includes a plurality of output ports 136 (including switching control ports for each of switch control signals $S1_{CTL}$-$S8_{CTL}$), by which the control circuitry 120 provides respective switch control signals for switches S1-S8.

As shown, the legs of the converter 102 are electrically coupled to the input port 104 and output port 106 through a matrix array 110. In some embodiments, for different converter configurations (e.g., as illustrated in FIG. 5) the matrix array 110 may be removable and may be replaced by a different matrix array. In some embodiments, as shown, inductors and/or capacitors may electrically couple legs of the converter 102 to the input port 104 or output port 106. The inductors may be configured to reduce current spikes and the capacitors may smooth voltages.

In some embodiments, the OBC 100 comprises a totem pole power factor correction (PFC) circuit comprising the first leg 112, the second leg 114 (e.g., a shared leg), the third leg 116, and the fourth leg 118 (e.g., a neutral leg). The first and second switch control signals switch $S1_{CTL}$ and $S2_{CTL}$ are switched at a first frequency. For example, the first frequency is 1 kHz-10 MHz (switching at a frequency lower than 1 kHz may result in higher magnetics and/or filtering requirements). In some embodiments, first and second switch control signals switch $S1_{CTL}$ and $S2_{CTL}$ are complementary signals (e.g., to prevent short-circuit current through a respective leg). The third and fourth switch control signals switch $S3_{CTL}$ and $S4_{CTL}$ are switched at a second frequency (e.g., 60 Hz (e.g., in the U.S.), 50 Hz, fundamental frequency of the received AC source input voltage, which is the fundamental frequency of the power system supplying the AC source input voltage). In some embodiments, the third and fourth switch control signals switch $S3_{CTL}$ and $S4_{CTL}$ are complementary signals. The fifth and sixth switch control signals switch $S5_{CTL}$ and $S6_{CTL}$ are switched at a third frequency. For example, the third frequency is 1 kHz-10 MHz. In some embodiments, the fifth and sixth switch control signals switch $S5_{CTL}$ and $S6_{CTL}$ are complementary signals. The seventh and eighth switch control signals switch $S7_{CTL}$ and $S8_{CTL}$ are switched at a fourth frequency. For example, the fourth frequency is 1 kHz-10 MHz. In some embodiments, the seventh and eighth switch control signals switch $S7_{CTL}$ and $S8_{CTL}$ are complementary signals. In some embodiments, because the second leg 114 is switched at a low frequency, the switches S3 and S4 of the second leg 114 may comprise less costly devices (e.g., a MOSFET, Silicon-based switch instead of a wide bandgap switch). In some examples, because power dissipation is reduced (compared to an inverter that entirely switches at high frequencies to generate a split-phase signal), the corresponding device's thermal requirements may also be reduced (for example, heat sink size may be reduced). In some embodiments, the other switches (e.g., S1, S2, and S5-S8) may be a wide-band-gap semiconductor device, such as a switch comprising Gallium Nitride, Silicon Carbide, a wide bandgap semiconductor, or a combination thereof, which may be configured to switch at the higher frequency. In some embodiments, if the converter 102 is configured to be used in different configurations (e.g., using different legs as the shared leg), all of the switches S1-S8 may comprise a wide-band-gap semiconductor device. The generation of the switch control signals $S1_{CTL}$-$S8_{CTL}$ are explained in greater detail below.

Figure 2A:
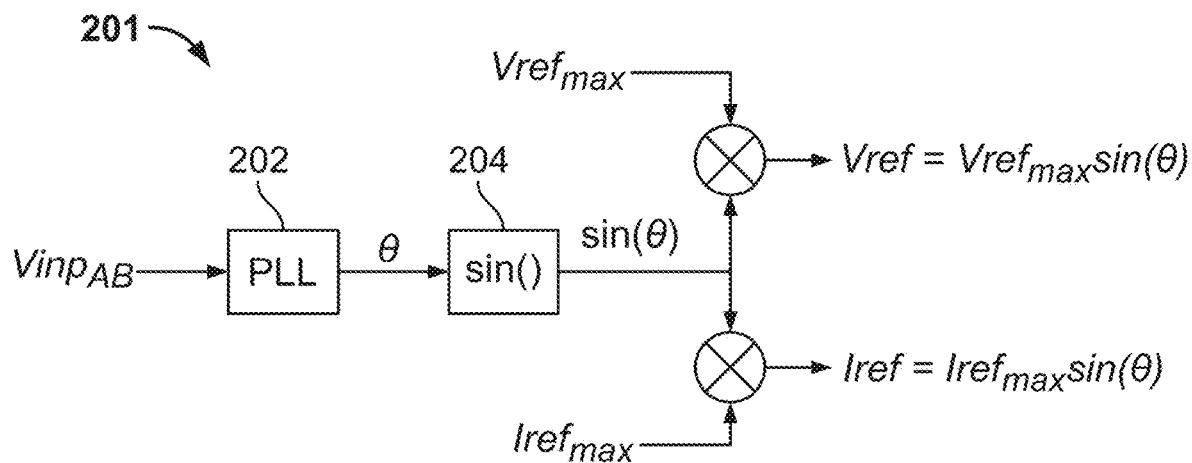
FIGS. 2A and 2B are illustrative block diagrams of control circuitry and operations for implementing a control process for the OBC, in accordance with some embodiments of the present disclosure.
Figure 2B:
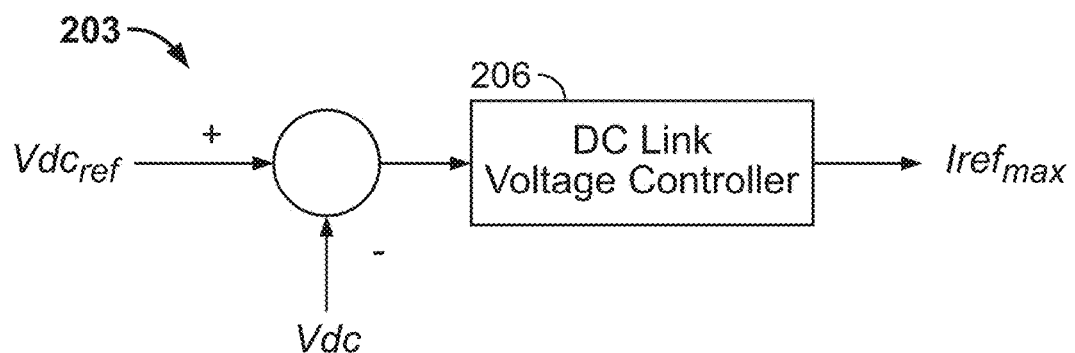

FIGS. 2A and 2B are illustrative block diagrams of control circuitry and operations for implementing a control process for the OBC 100, in accordance with some embodiments of the present disclosure. FIG. 2A shows a voltage and current reference generation module 201 for generating voltage reference Vref and current reference Iref for driving the converter 102, as explained in greater detail with reference to FIG. 3. The voltage reference Vref may correspond to the desired output power signal voltage ($Vout_{AB}$). For example, the voltage reference Vref may be 240V RMS. Similarly, the current reference Iref may correspond to a desired charging current for charging the battery 108. As shown, the voltage and current reference generation module 201 includes a phase lock loop (PLL) 202 and sin( ) function 204 to track the angle of the received AC source input voltage ($Vinp_{AB}$) sensed across inputs 113 and 115a. A reference voltage Vref and a reference current Iref are derived from the tracked angle so that the sign (e.g., polarity) of the generated power output $Vout_{AB}$ is the same as the sign of the generated charging voltage ($Vrect_{AB}$) and the slow leg (e.g., the second leg 114) may be shared for the power output and charging functions, as described in further detail below.

FIG. 2B shows a DC link voltage control module 203 for determining a maximum reference current ($Iref_{max}$) for driving the converter 102, as explained in greater detail with reference to FIG. 3. If a rectifier is used to regulate the DC link voltage (Vdc), then the maximum reference current ($Iref_{max}$) may be determined by comparing a reference link voltage ($Vdc_{ref}$) with the measured DC link voltage and inputting a result of this comparison into a DC link voltage controller 206. In some embodiments, if the DC link voltage (Vdc) is regulated by some other means, the maximum reference current ($Iref_{max}$) may be determined as a constant value based on a charging current demand for charging the battery 108.

Figure 3:
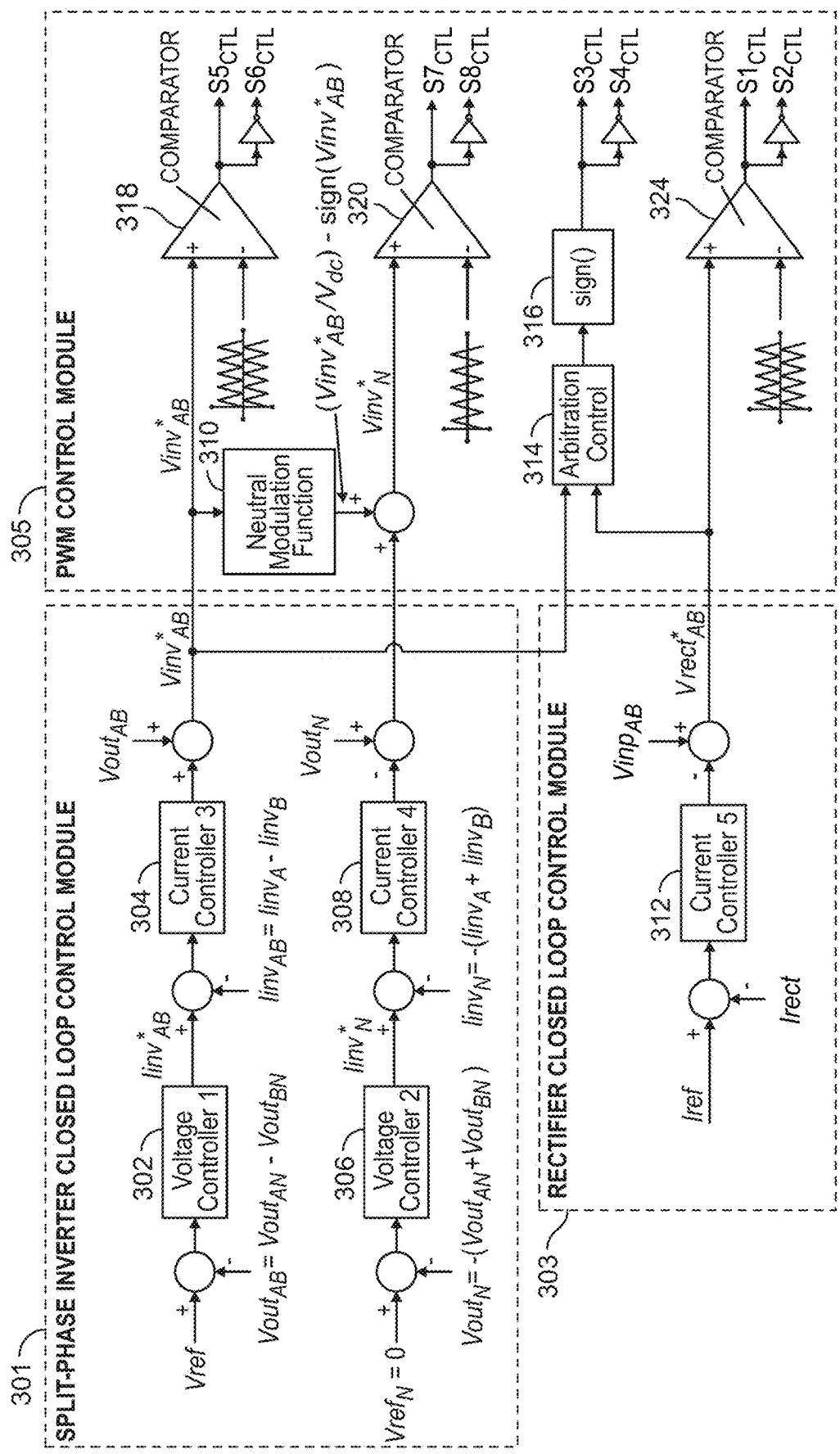
FIG. 3 is an illustrative block diagram of control circuitry and operations for implementing a control process for the OBC, in accordance with some embodiments of the present disclosure.

FIG. 3 is an illustrative block diagram of control circuitry and operations for implementing a control process for the OBC 100, in accordance with some embodiments of the present disclosure. The control process may be implemented by the control circuitry 120 of FIG. 1. For convenience of description, the control process is described as being performed by a plurality of modules implemented by the control circuitry 120. For example, as shown, the control circuitry 120 implements a split-phase inverter closed-loop control module 301, a rectifier closed-loop control module 303, and a PWM control module 305.

As shown, the split-phase inverter closed-loop control module 201 generates desired voltage signal $Vinv^*_{AB}$ and $Vinv^*_N$ that are fed to the PWM control module 305 to generate the switch control signals for the third leg 116 and the fourth leg 118 of the converter 102. For example, to generate the switch control signals for the third leg 116, a determined output voltage $Vout_{AB}$ (e.g., the output voltage $Vout_{AN}$–the output voltage $Vout_{BN}$) is subtracted from the reference voltage Vref (e.g., described above in FIG. 2A). A result of this operation is processed by a voltage controller 302 to generate a current $Iinv^*_{AB}$, from which a determined current IinvAB (e.g., the second current IinvA—the third current InivB) is subtracted. A result of this operation is processed by a current controller 304. The output of the current controller 304 is added with the determined output voltage $Vout_{AB}$ to generate the desired voltage signal $Vinv^*_{AB}$ for driving the third leg 116. The desired voltage signal $Vinv^*_{AB}$ is compared with a carrier signal (e.g., a sawtooth signal at a 50% duty cycle at the third frequency) by a comparator 318 of the PWM control module 305 to generate the fifth and sixth switch control signals $S5_{CTL}$ and $S6_{CTL}$. As shown, because the fifth and sixth switch control signals $S5_{CTL}$ and $S6_{CTL}$ are complementary signals, the sixth switch control signal $S6_{CTL}$ may be generated by inverting the fifth switch control signal $S5_{CTL}$.

As shown, to generate the switch control signals for the fourth leg 116 (e.g., the neutral leg), a determined output voltage $Vout_N$ (e.g., the output voltage $Vout_{AN}$+the output voltage $Vout_{BN}$) is subtracted from a reference voltage $Vref_N$ (e.g., 0v). A result of this operation is processed by a voltage controller 306 to generate a current $Iinv^*_N$, from which a determined current $Iinv_N$ (e.g., the negative of the second current IinvA+the third current InivB) is subtracted. A result of this operation is processed by a current controller 308.

The output of the current controller 308 is subtracted from the determined output voltage $Vout_{AB}$ and a result of this operation is added to an output of a neutral modulation function 310 to generate the desired voltage signal $Vinv^*_N$ for driving the fourth leg 118. The desired voltage signal $Vinv^*_N$ is compared with a carrier signal (e.g., a sawtooth signal at a 50% duty cycle at the fourth frequency) by a comparator 320 of the PWM control module 305 to generate the seventh and eight switch control signals $S7_{CTL}$ and $S8_{CTL}$, as similarly described above. As shown, the neutral modulation function 310 may be: ($Vinv^*_{AB}/V_{dc}$)–sign ($Vinv^*_{AB}$).

As shown, the rectifier closed-loop control module 303 generates a desired voltage signal $Vrect^*_{AB}$ that is fed to the PWM control module 305 to generate the switch control signals for the first leg 112. The measured first current Irect is subtracted from the reference current Iref (e.g., described above in FIG. 2A). A result of this operation is processed by a current controller 312. An output of the current controller 312 is subtracted from the measured voltage the AC source input voltage $Vinp_{AB}$ to generate the desired voltage signal $Vrect^*_{AB}$ for driving the first leg 112. The desired voltage signal $Vrect^*_{AB}$ is compared with a carrier signal (e.g., a sawtooth signal at a 50% duty cycle at the first frequency) by a comparator 324 of the PWM control module 305 to generate the first and second switch control signals $S1_{CTL}$ and $S2_{CTL}$, as similarly described above.

Finally, to generate the switch control signals for the second leg 114 (e.g., the shared leg), the desired voltage signals $Vinv^*_{AB}$ and $Vrect^*_{AB}$ are processed by the arbitration control logic 314 and sign( ) function 316 so that the second leg 114 is synchronized with the power generation (e.g., the inverting function) and the charging (e.g., the rectifying function). That is, the third and fourth switch control signals $S3_{CTL}$ and $S4_{CTL}$ may be generated based on the sign of desired voltage signals $Vinv^*_{AB}$ and $Vrect^*_{AB}$. To ensure that there is no mismatch between the sign of $Vinv_{AB}$ and the sign of $Vrect_{AB}$ the arbitration control logic 314 may apply arbitration control to turn off all of the switches S1-S8. For example, the arbitration control logic 314 may set blanking times around zero crosses of $Vinv_{AB}$ and $Vrect_{AB}$, as described in greater detail with reference to FIG. 4. By preventing a conflict between $Vinv_{AB}$ and $Vrect_{AB}$ the second leg 114 may be shared and the charging and power export may be provided simultaneously. It is understood that the control circuitry illustrated in FIG. 3 is exemplary, and that other suitable control circuitry may be used to generate the desired switching control signals.

Figure 4:
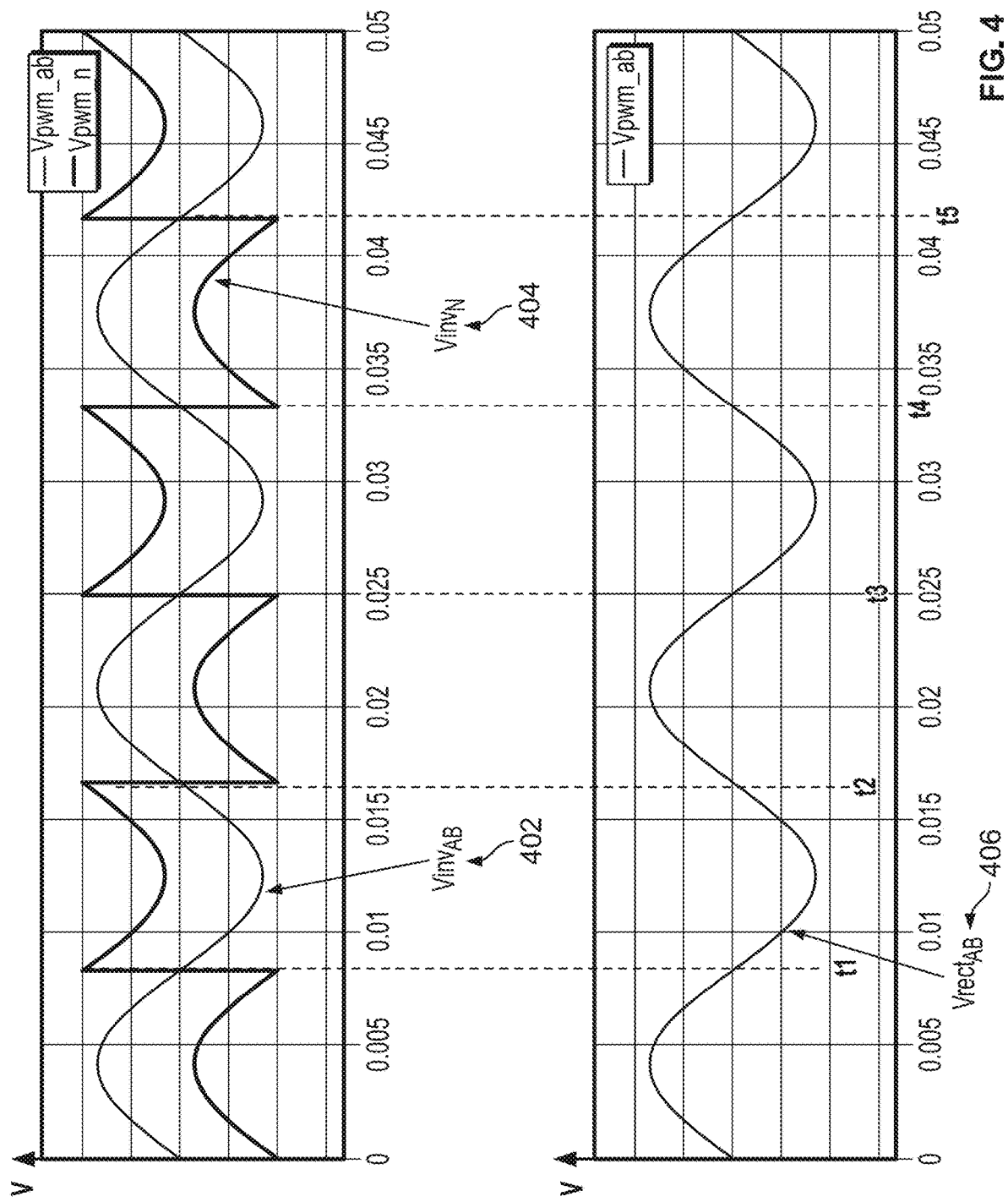
FIG. 4 are illustrative waveforms of the operating voltages of the OBC with respect to time, in accordance with some embodiments of the present disclosure.

FIG. 4 are illustrative waveforms of the operating voltages of the OBC 100 with respect to time, in accordance with some embodiments of the present disclosure. As shown, $Vinv_{AB}$ 402 is a waveform of the power output of the converter 102 (e.g., the voltage across the outputs 115b and 117), $Vinv_{AB}$ 402 is the voltage generated by the fourth leg 118, and $Vrect_{AB}$ 406 is a waveform of the charging output of the converter 102. As shown, at the zero crosses of $Vinv_{AB}$ 402 and $Vrect_{AB}$ 406 (e.g., times t1, t2, t3, t4, t5, etc), blanking periods may be inserted. During the blanking periods, as described above, all of the switches S1-S8 may be switched off, to prevent any conflicts between $Vinv_{AB}$ and $Vrect_{AB}$ (e.g., the sign $Vinv_{AB}$ 402≠the sign $Vrect_{AB}$ 406). In some embodiments, the blanking periods may be inserted when the control signals for generating $Vinv_{AB}$ and $Vrect_{AB}$ conflict (e.g., they direct the converter 102 to simultaneously generate power signals having different polarities).

FIG. 5 shows an illustrative block diagram of an OBC 500 for an electric vehicle, in accordance with some embodiments of the present disclosure. As shown, the OBC 500 includes a converter 502 (e.g., a power converter), a storage 511, and control circuitry 520 configured to control the converter 502 to simultaneously charge a battery 108 (e.g., a battery of an electric vehicle) and to provide power export (e.g., a single-phase 120V power signal) from the battery 108. The OBC 500 is similar to the OBC 100 of FIG. 1, except that the OBC 500 is configured to generate a charging signal that has twice the power of the charging signal generated by the OBC 100 but an output power signal that is a signal-phase voltage. As shown, the OBC 500 may be configured by electrically connecting the legs of the converter 502 to the input port 504 and output port 506 through a matrix array 510 (e.g., compared with the different connections may by the matrix array 110 of FIG. 1). For convenience of description, like functions, structures, and variables of the OBC 100 of FIG. 1 and the OBC 500 are not repetitively described herein.

As shown, converter 502 is a four-leg converter including a first leg 512, a second leg 514, a third leg 516, and a fourth leg 518. Although a four-leg converter is shown, it should be understood that the converter 502 may include additional legs (e.g., for increasing the power output of the converter 502). As shown, the first leg 512 includes switches S1 and S2, the second leg 514 includes switches S3 and S4, the third leg 516 includes switches S5 and S6, and the fourth leg 518 includes switches S7 and S8. The first leg 512 is configured to generate a first signal (Arect1') in response to switch control signals $S1_{CTL}$ and $S2_{CTL}$ switching the first and second switches S1 and S2, respectively. The second leg 514 is configured to generate a second signal (Arect2') in response to switch control signals $S3_{CTL}$ and $S4_{CTL}$ switching the third and fourth switches S3 and S4, respectively. The third leg 516 is configured to generate a third signal (Ainv') in response to switch control signals $S5_{CTL}$ and $S6_{CTL}$ switching the fifth and sixth switches S5 and S6, respectively. The fourth leg 518 is a shared leg between the power output and charging functions is configured to generate a fourth signal (Brect/Ninv') in response to switch control signals $S7_{CTL}$ and $S8_{CTL}$ switching the seventh and eight second switches S7 and S8, respectively. Although the converter 502 is described with respect to switches (and in some examples, transistors), it should be appreciated that switches S1-S8 may be other kinds of switching devices. One or more of the switch control signals $S1_{CTL}$-$S8_{CTL}$ may be pulse-width modulated signals. The pulse widths of these signals are modulated to control respective switches, and together, the switches simultaneously generate a desired charging signal for charging the battery 108 and a desired output power signal (e.g., a single-phase AC signal having a root mean square (RMS) voltage of 120V across outputs 517 and 519). The control circuitry 120 may generate the switch control signals $S1_{CTL}$-$S8_{CTL}$ as explained in further detail below.

As shown, the control circuitry 520 includes a plurality of voltage and current input ports, including first voltage input port 522 ($Vinp_{AB}$), second voltage input port 528 ($Vout_{AN}$), third voltage input port 534 ($V_{dc}$), first current input port 524 (Irect1), second current input port 526 (Irect2), and third current input port (IinvA). The control circuitry 120 is configured to sense a voltage an AC source input voltage ($Vinp_{AB}$) across inputs 513 and 515 via the first voltage input port 522. The AC source input voltage may be a voltage received from a power system (e.g., 120V or 240V) at input port 104 and may have a fundamental frequency of the power system (e.g., 50 Hz or 60 Hz (e.g., in the U.S.)). The control circuitry 120 is configured to sense a first AC output voltage ($Vout_{AN}$) across outputs 517 and 519 via the second voltage input port 528. The control circuitry 120 is configured to sense a DC link voltage ($V_{dc}$) across the output of the converter 502 via the third voltage input port 534. The control circuitry 120 is configured to sense a first current (Irect1) of the AC source input voltage at input 513 via first current input port 524. The control circuitry 120 is configured to sense a second current (Irect2) via the second current input port 526 and sense a third current (IinvA) via the third current input port 530. The control circuit 120 also includes a plurality of output ports 536 (including switching control ports for each of switch control signals $S1_{CTL}$-$S8_{CTL}$), by which the control circuitry 120 provides respective switch control signals for switches S1-S8, as similarly described above with reference to FIG. 1.

As similarly described above with reference to FIG. 1, the OBC 100 may comprise a totem pole power factor correction (PFC) circuit comprising the first leg 512, the second leg 514, the third leg 516, and the fourth leg 518 (e.g., a neutral leg). However, in contrast to FIG. 1, the fourth leg 518 may be the shared leg that is switched at the fundamental frequency. The generation of the switch control signals $S1_{CTL}$-$S8_{CTL}$ are explained in greater detail below.

Figure 6:
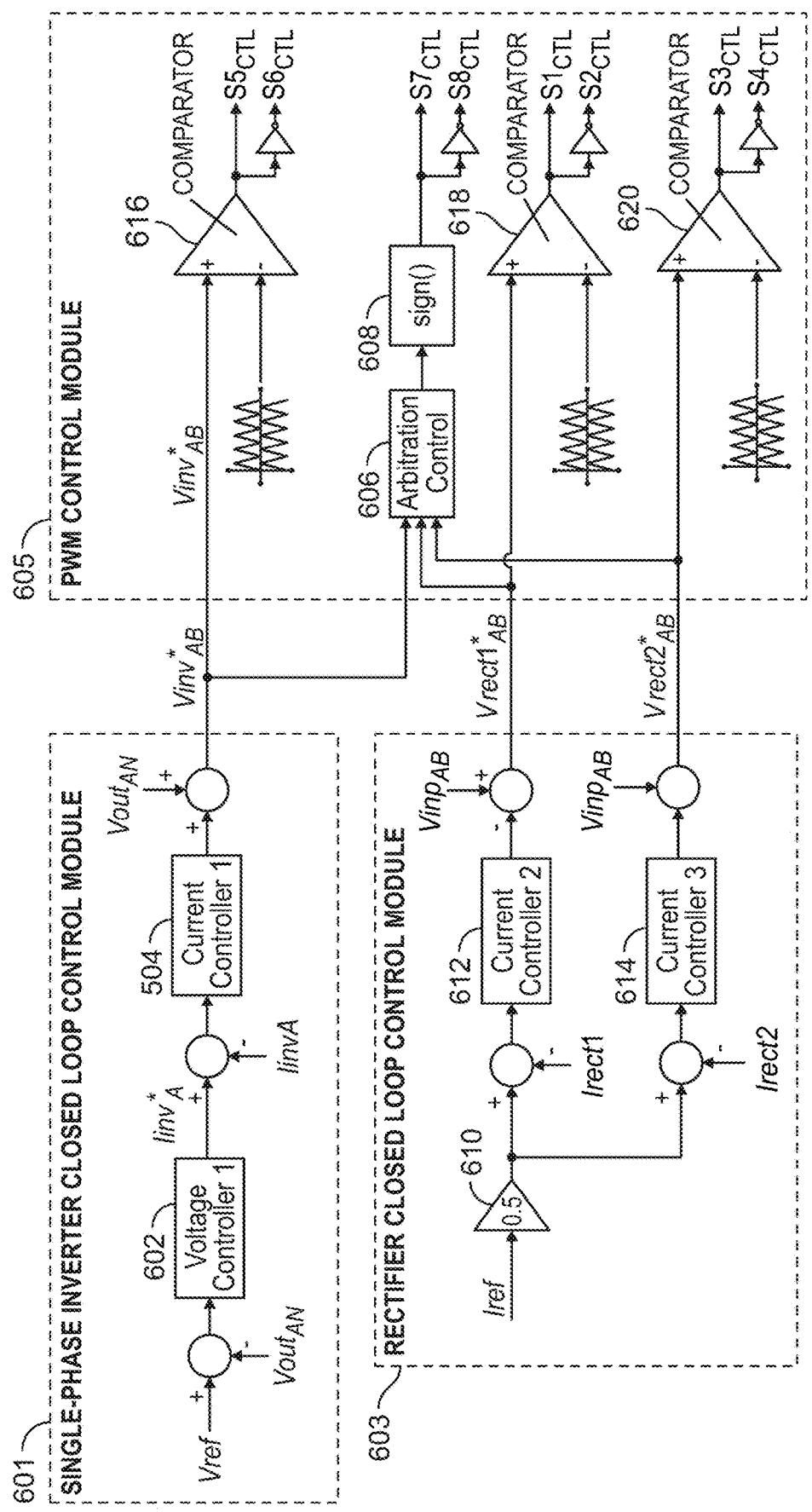
FIG. 6 is an illustrative block diagram of control circuitry and operations for implementing a control process for the OBC of FIG. 5, in accordance with some embodiments of the present disclosure.

FIG. 6 is an illustrative block diagram of control circuitry and operations for implementing a control process for the OBC 500, in accordance with some embodiments of the present disclosure. The control process may be implemented by the control circuitry 520 of FIG. 5. For convenience of description, the control process is described as being performed by a plurality of modules implemented by the control circuitry 520. For example, as shown, the control circuitry 120 implements a single-phase inverter closed-loop control module 601, a rectifier closed-loop control module 603, and a PWM control module 605.

As shown, the single-phase inverter closed-loop control module 601 generates the desired voltage signal $Vinv^*_{AB}$ that is fed to the PWM control module 605 to generate the switch control signals for the third leg 516 of the converter 502. The desired voltage signal $Vinv^*_{AB}$ is generated in a similar manner as the desired voltage signal $Vinv^*_{AB}$ described with reference to FIG. 3, except that the reference voltage Vref and the output voltage $Vout_{AN}$ correspond to the single-phase output of the converter 502. Thus, the generation of the desired voltage signal $Vinv^*_{AB}$ is not described again in detail. As shown, the desired voltage signal $Vinv^*_{AB}$ is compared with a carrier signal (e.g., a sawtooth signal at a 50% duty cycle at the third frequency) by a comparator 616 of the PWM control module 605 to generate the fifth and sixth switch control signals $S5_{CTL}$ and $S6_{CTL}$. As shown, because the fifth and sixth switch control signals $S5_{CTL}$ and $S6_{CTL}$ are complementary signals, the sixth switch control signal $S6_{CTL}$ may be generated by inverting the fifth switch control signal $S5_{CTL}$.

As shown, to generate the switch control signals for the first leg 512 and the second leg 514, the rectifier closed-loop control module 603 generates desired voltage signals $Vrect1^*_{AB}$ and $Vrect2^*_{AB}$. The desired voltage signals $Vrect1^*_{AB}$ and $Vrect2^*_{AB}$ are generated in a similar manner as the desired voltage signal $Vrect^*_{AB}$ except that the reference current Iref is halved before being fed to each leg of the rectified closed-loop control module 603. Thus, the generation of the desired voltage signals $Vrect1^*_{AB}$ and $Vrect2^*_{AB}$ are not described again in detail. As shown, the desired voltage signal $Vrect1^*_{AB}$ is compared with a carrier signal (e.g., a sawtooth signal at a 50% duty cycle at the third frequency) by a comparator 618 of the PWM control module 605 to generate the first and second switch control signals $S1_{CTL}$ and $S2_{CTL}$. Similarly, the desired voltage signal $Vrect2*_{AB}$ is compared with a carrier signal (e.g., a sawtooth signal at a 50% duty cycle at the third frequency) by a comparator 620 of the PWM control module 605 to generate the third and fourth control signals $S3_{CTL}$ and $S4_{CTL}$.

Finally, to generate the switch control signals for the fourth leg 518 (e.g., the shared leg), the desired voltage signals $Vinv*_{AB}$, $Vrect1*_{AB}$, and $Vrect1*_{AB}$ are processed by the arbitration control logic 606 and sign( ) function 608 so that the fourth leg 518 is synchronized with the power generation (e.g., the inverting function) and the charging (e.g., the rectifying function). That is, the seventh and eight control signals $S7_{CTL}$ and $S8_{CTL}$ may be generated based on the sign (polarity) of desired voltage signals $Vinv*_{AB}$, $Vrect1*_{AB}$, and $Vrect1*_{AB}$. To ensure that there is no mismatch between the sign of $Vinv_{AB}$ and the sign of $Vrect_{AB}$ the arbitration control logic 606 may apply arbitration control to turn off all of the switches S1-S8. For example, the arbitration control logic 606 may set blanking times around zero crosses of $Vinv_{AB}$ and $Vrect_{AB}$, as similarly described above. By preventing a conflict between $Vinv_{AB}$ and $Vrect_{AB}$ the fourth leg 518 may be shared and the charging and power export may be provided simultaneously. It is understood that the control circuitry illustrated in FIG. 6 is exemplary, and that other suitable control circuitry may be used to generate the desired switching control signals.

Figure 7:
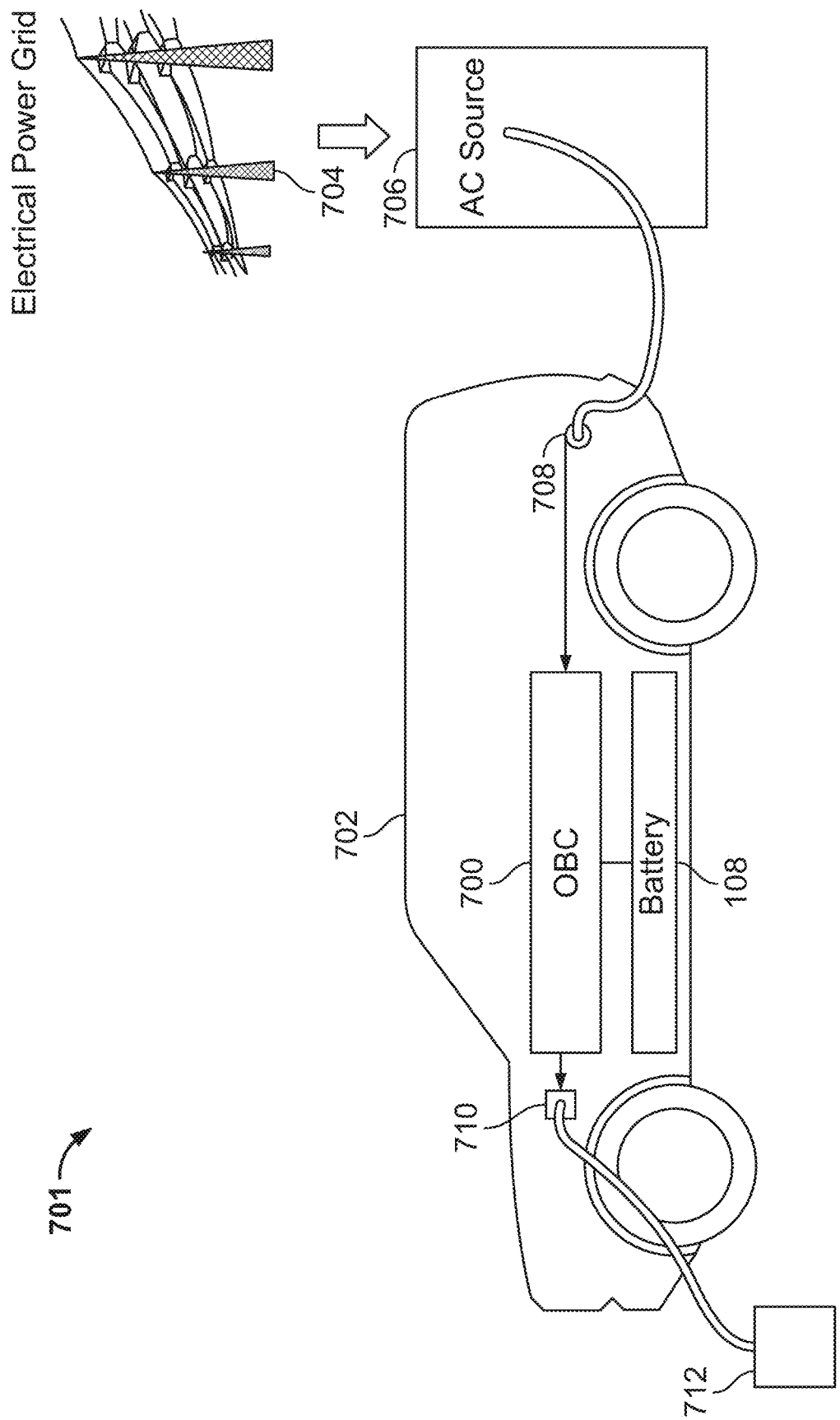
FIG. 7 is an illustrative block diagram of an electric vehicle charging system including an electric vehicle having an OBC, in accordance with some embodiments of the disclosure.

FIG. 7 is an illustrative block diagram of an electric vehicle charging system 701 including an electric vehicle 702 having an OBC 700, in accordance with some embodiments of the disclosure. As shown, the system 701 includes the electric vehicle 702, an electrical power grid 704, and an AC charger 706. The electric vehicle 702 includes a battery 108 and the OBC 700. The OBC 700 may be the OBC 100 of FIG. 1 or the OBC 500 of FIG. 5. The electrical power grid 704 may provide an alternating current (AC) source voltage to the AC charger 706. When the electric vehicle 702 is connected to the AC charger 706 (via input port 708), the AC source voltage is provided to the OBC 700. As explained above, the OBC 700 may simultaneously generate a charging signal (e.g., for charging the battery 108) and a power signal. The power signal may be provided to an output port 710. The output port 710 may be an output port of the electric vehicle 702 or may connect to one or more power systems of the electric vehicle 702. As shown, an electrical accessory 712 may be connected to the output port 710 and provided with the generated power signal. Although only a signal output port 710 is shown, it should be understood that the electric vehicle 702 may include a plurality of output ports.

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method for simultaneously generating an direct current (DC) charging signal and an AC power signal via a converter having a first leg, a second leg, a third leg, and a fourth leg, the method comprising: receiving an AC source input voltage having a fundamental frequency of a power system; generating, by the first leg and the second leg, the DC charging signal; and generating, by the second leg, the third leg, and the fourth leg, the AC power signal, wherein the second leg is switched at the fundamental frequency and the first leg, the third leg, the fourth leg are switched at frequencies higher than the fundamental frequency, and the DC charging signal and the AC power signal are generated for simultaneous output.

2. The method of claim 1, wherein the DC charging signal and the AC power signal are synchronized to the received AC source input voltage using a phase-lock-loop such that a polarity of a DC charging voltage is equal to a polarity of the power signal.

3. The method of claim 1, further comprising inserting a blanking period at zero crosses of the charging voltage and the AC power signal, wherein during each blanking period, switches of the first leg, the second leg, the third leg, and the fourth leg are switched off.

4. The method of claim 1, wherein the AC power signal is a split-phase power signal having a root mean square voltage of 240V.

5. The method of claim 1, wherein the fundamental frequency is within a range of 50-60 Hz.

6. The method of claim 1, wherein the switching frequencies of the first leg, the third leg, and the fourth leg are within a range of 1 kHz-10 MHz.

7. A method for simultaneously generating a split-phase power signal and a direct current (DC) charging signal via a converter having a first leg, a second leg, a third leg, and a fourth leg, the method comprising: receiving an alternating current AC source input voltage having a fundamental frequency of a power system; switching, at a first frequency, the first leg comprising a first switch and a second switch to generate a first signal; switching, at the fundamental frequency, the second leg comprising a third switch and a fourth switch to generate a second signal; switching, at a third frequency, the third leg comprising a fifth switch and a sixth switch to generate a third signal; and switching, at a fourth frequency, the fourth leg comprising a seventh switch and an eight switch to generate a fourth signal; generating, based on the first signal and the second signal, a DC charging voltage for charging a battery connected to the converter; and generating, based on the second signal, the third signal, and the fourth signal, the split-phase power signal, wherein the DC charging voltage and the split-phase power signal are generated for simultaneous output.

8. The method of claim 7, wherein the split-phase power signal and the DC charging voltage are synchronized to the received AC source input voltage using a phase-lock-loop such that a polarity of the DC charging voltage is equal to a polarity of the split-phase power signal.

9. The method of claim 7, further comprising inserting a blanking period at zero crosses of the DC charging voltage and the split-phase power signal, wherein during each blanking period, each of the first switch, the second switch, the third switch, the fourth switch, the fifth switch, the sixth switch, the seventh switch, and the eight switch are switched off.

10. The method of claim 7, wherein the fundamental frequency is within a range of 50-60 Hz.

11. The method of claim 7, wherein each of the first frequency, the third frequency, and the fourth frequency is within a range of 1 kHz-10 MHz.

12. The method of claim 7, wherein:
each of the third switch and the fourth switch comprises a metal-oxide-semiconductor field effect transistor (MOSFET), insulated-gate bipolar transistor, or any combination thereof; and
each of the first switch, the second switch, the fifth switch, the sixth switch, the seventh switch, and the eighth switch comprise a wide-band-gap semiconductor device.

13. The method of claim 7, wherein a root mean square voltage of the split-phase power signal is 240V.

14. A method for simultaneously generating a split-phase power signal and a direct current (DC) charging signal via a converter having a first leg, a second leg, a third leg, and a fourth leg, the method comprising: receiving an alternating current AC source input voltage having a fundamental frequency of a power system; switching, at a first frequency, the first leg comprising a first switch and a second switch to generate a first signal; switching, at a second frequency, the second leg comprising a third switch and a fourth switch to generate a second signal; switching, at a third frequency, the third leg comprising a fifth switch and a sixth switch to generate a third signal; and switching, at the fundamental frequency, the fourth leg comprising a seventh switch and an eighth switch to generate a fourth signal; generating, based on the first signal, the second signal, and the fourth signal, an ADC charging voltage for charging a battery connected to the converter; and generating, based on the third signal and the fourth signal, the single-phase power signal, wherein the A DC charging voltage and the single-phase power signal are generated for simultaneous output.

15. The method of claim 14, wherein the single-phase power signal and the DC charging voltage are synchronized to the received AC source input voltage using a phase-lock-loop such that a polarity of the DC charging voltage is equal to a polarity of the single-phase power signal.

16. The method of claim 14, further comprising inserting a blanking period at zero crosses of the DC charging voltage and the single-phase power signal, wherein during each blanking period, each of the first switch, the second switch, the third switch, the fourth switch, the fifth switch, the sixth switch, the seventh switch, and the eight switch are switched off.

17. The method of claim 14, wherein the fundamental frequency is within a range of 50-60 Hz.

18. The method of claim 14, wherein each of the first frequency, the second frequency, and the third frequency is within a range of 1 kHz-10 MHz.

19. The method of claim 14, wherein:
each of the seventh switch and the eighth switch comprises a metal-oxide-semiconductor field effect transistor (MOSFET), insulated-gate bipolar transistor, or any combination thereof; and
each of the first switch, the second switch, the third switch, the fourth switch, the fifth switch, and the sixth switch comprise a wide-band-gap semiconductor device.

20. The method of claim 14, wherein a root mean square voltage of the single-phase power signal is 120V.

* * * * *